US007588403B2

(12) United States Patent
Symonds

(10) Patent No.: US 7,588,403 B2
(45) Date of Patent: Sep. 15, 2009

(54) POLE HANDLING APPARATUS

(76) Inventor: Stephen M. Symonds, 8724 N. Royal La., Euless, TX (US) 75063

( * ) Notice: Subject to any disclaimer, the term of this patent is extended or adjusted under 35 U.S.C. 154(b) by 270 days.

(21) Appl. No.: 11/642,251

(22) Filed: Dec. 19, 2006

(65) Prior Publication Data

US 2008/0145189 A1 Jun. 19, 2008

(51) Int. Cl.
*A01G 23/02* (2006.01)
*B65F 3/00* (2006.01)
*B65F 1/00* (2006.01)
*B66C 1/00* (2006.01)

(52) U.S. Cl. ......................... 414/23; 414/550; 414/555; 414/740

(58) Field of Classification Search ................. 294/115; 414/23, 24, 408, 620, 735, 739–740, 550, 414/555

See application file for complete search history.

(56) References Cited

U.S. PATENT DOCUMENTS

| | | | | |
|---|---|---|---|---|
| 2,611,498 | A | 9/1952 | Broersma | |
| 3,263,834 | A * | 8/1966 | La Tendresse | 414/550 |
| 3,587,872 | A * | 6/1971 | Pauly | 414/732 |
| 3,613,923 | A | 10/1971 | Albright | |
| 4,252,360 | A * | 2/1981 | Gallaher, Jr. | 414/732 |
| 4,280,785 | A * | 7/1981 | Albrecht | 414/735 |
| 4,432,691 | A | 2/1984 | Sterner | |
| 4,461,608 | A | 7/1984 | Boda | |
| 4,645,410 | A | 2/1987 | Royer | |
| 4,718,816 | A | 1/1988 | King | |
| 5,184,934 | A | 2/1993 | Gallo | |
| 5,284,375 | A * | 2/1994 | Land, III | 294/88 |
| 6,494,515 | B1 | 12/2002 | Kalbfleisch | |

* cited by examiner

*Primary Examiner*—Gregory W Adams
(74) *Attorney, Agent, or Firm*—Gardere Wynne Sewell LLP

(57) ABSTRACT

Pole or mast handling apparatus adapted for mounting on a loader type vehicle, such as a tractor mounted loader or skid steer type loader having one or more booms movable between reclined position and an elevated position, the booms including a support member mounted at a distal end and positionable with respect to the booms. The apparatus includes a frame for mounting on the support member and a pair of pole grasping jaws which are selectively operable by a hydraulic actuator to move between pole grasping and non-grasping positions. The booms and support member may be oriented such that the apparatus is in a position to grasp a pole in a reclined position and by raising the boom and retracting the support member, rotate the apparatus so that the pole is in an erect position for placement in a receptacle.

20 Claims, 4 Drawing Sheets

POLE HANDLING APPARATUS

BACKGROUND OF THE INVENTION

Elongated pole or mast structures, such as flagpoles, utility poles, light standards, sign posts and similar structures, are difficult to handle with respect to placing the pole erect in a working position or removing the pole from a working position. Typically, such structures are manipulated by cranes supporting block and tackle type rigging connected to the pole to be handled. However, this type of handling of elongated flagpoles, for example, is difficult and somewhat hazardous.

Accordingly, there has been a need to develop equipment or apparatus for handling elongated pole-like structures, such as flagpoles, utility poles, masts and similar structures. It is to these ends that the present invention has been developed.

SUMMARY OF THE INVENTION

The present invention provides a pole handling apparatus useful for placing poles, such as flag poles, in their working positions and removing such poles from their working positions.

In accordance with one aspect of the present invention an apparatus is provided for attachment to or including a so-called loader, such as a tractor type loader or a skid steer type loader vehicle. Such vehicles are typically provided with spaced apart moveable booms which may be raised and lowered by hydraulic actuators, for example. The boom distal ends are adapted to pivotally support a support member for connection of a loader bucket or other attachments, for example to the booms. The apparatus of the present invention is advantageously mountable on the aforementioned support member, which support member is moveable with respect to the aforementioned booms by additional actuators, such as hydraulic cylinder and piston assemblies. Still further, the apparatus of the invention includes a frame for attachment to the loader support member and pair of jaws moveable relative to each other between pole clamping and non-clamping positions. The pole clamping jaws are mounted on an elongated support beam which places the jaws laterally to one side of the loader booms and the jaws and other structure may be counter-weighted by an adjustable counterweight mechanism which extends from an opposite side of the apparatus of the present invention.

In accordance with another aspect of the present invention, the aforementioned apparatus is particularly advantageously configured in conjunction with the moveable booms for grasping a pole in a horizontal reclined position, and extending the loader booms or arms, as well as the member supporting the apparatus frame for rotating the pole from a reclined position to a substantially erect or vertically oriented position or placement in another working position of the pole. The jaws of the pole handling apparatus are controlled by an actuator which may be a pressure fluid actuator, such as a hydraulic cylinder type actuator, and may be controlled by the operator of the loader vehicle or apparatus to selectively grip the pole and release the pole sufficiently to allow placement of the pole in it working position. The apparatus of the present invention provides several advantages including operation in conjunction with so-called loader type vehicles of various types which include one or more moveable booms and a support member moveable relative to the boom or booms. The apparatus is relatively mechanically uncomplicated and durable and may be adjusted for handling poles of a wide variety of diameters, lengths, and weights, for example.

Those skilled in the art will further appreciate the above-mentioned advantages and superior features of the invention together with other important aspects thereof upon reading the detailed description which follows in conjunction with the drawings.

DETAILED DESCRIPTION OF A PREFERRED EMBODIMENT

Figure 1:
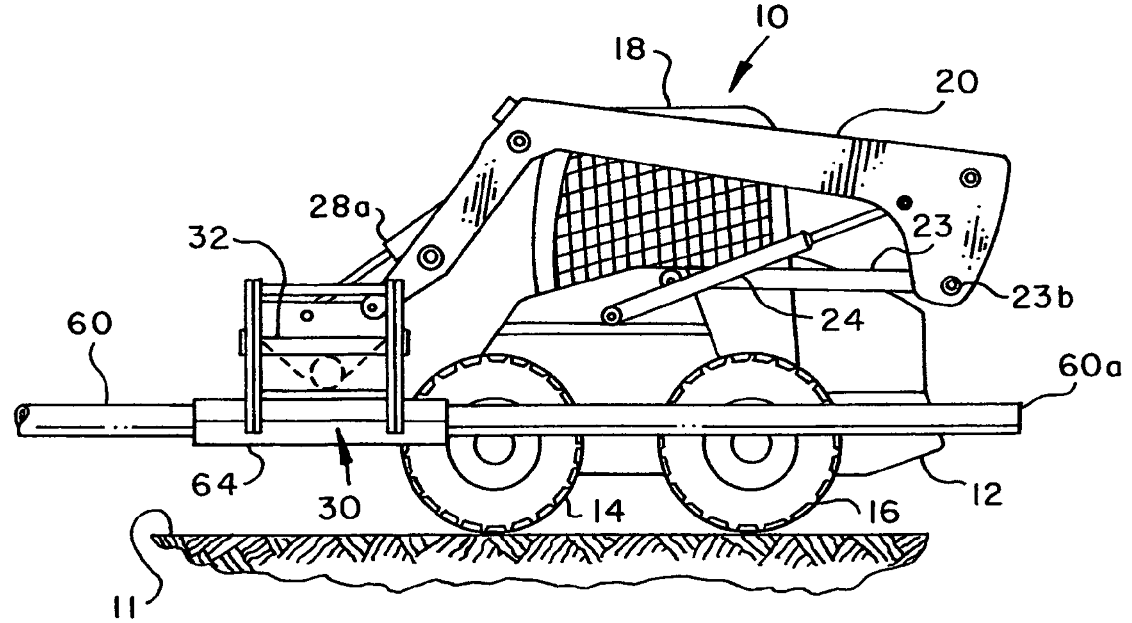
FIG. 1 is a side elevation of a pole handling apparatus of the invention shown grasping a utility or flag pole in a reclined or generally horizontal position.

In the description which follows like parts are marked throughout the specification and drawing with the same reference numerals, respectively. The drawing figures may not be to scale and certain features may be shown exaggerated in scale or in somewhat schematic form in the interest of clarity and conciseness.

Referring to FIG. 1, there is illustrated the invention in combination with an apparatus particularly useful for and comprising, essentially, a part of the invention. An exemplary embodiment of an apparatus is disclosed herein and is generally designated by the numeral 10. The apparatus 10 is commonly referred to as a loader and includes a self propelled, motorized, chassis 12, spaced apart support wheels 14 and 16 and an operators cab 18. The apparatus 10 may take various forms, but one apparatus useful as part of or in conjunction with the invention is a so-called skid steer type loader. One useful embodiment of the apparatus 10 is a 300 series skid steer loader manufactured by Deere & Company, Moline, Ill. and characterized as a self propelled skid steer vehicle which supports spaced apart moveable booms 20 and 22, see FIG. 4 also.

Figure 2:
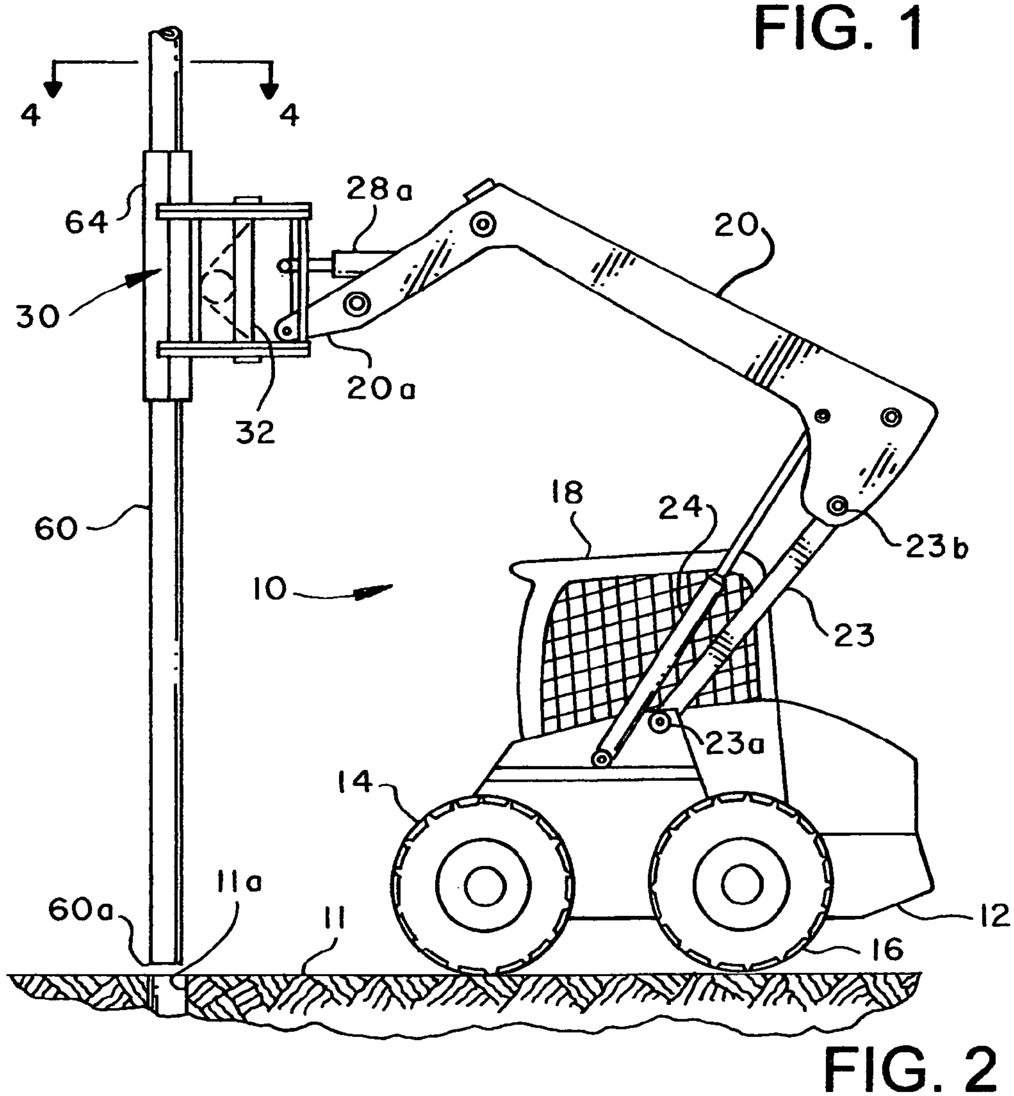
FIG. 2 is a side elevation of the apparatus shown in FIG. 1 showing the booms and support member moved to a position whereby the pole has been oriented in a substantially vertical position.

Booms 20 and 22 may be identical or mirror image parts with respect to each other and only boom 20 is shown in FIGS. 1 and 2. Booms 20 and 22 are mounted on chassis 12 for movement with respect thereto by linkages or arms 23, one shown in FIGS. 1 and 2, which arms are pivotably connected to chassis 12 at one end and to booms 20 and 22 at an opposite end, respectively, and as indicated by pivot points **23*a* and 23*b* for boom 20, FIG. 2. The booms 20 and 22 may be moved between a somewhat reclined or intermediate position, as shown in FIG. 1, to a more elevated position by pressure fluid actuators, such as hydraulic cylinder and piston type actuators 24, one shown in the drawing FIGS. 1 and 2. Actuators 24 are operator controlled for moving the booms 20 and 22** at will.

Figure 4:
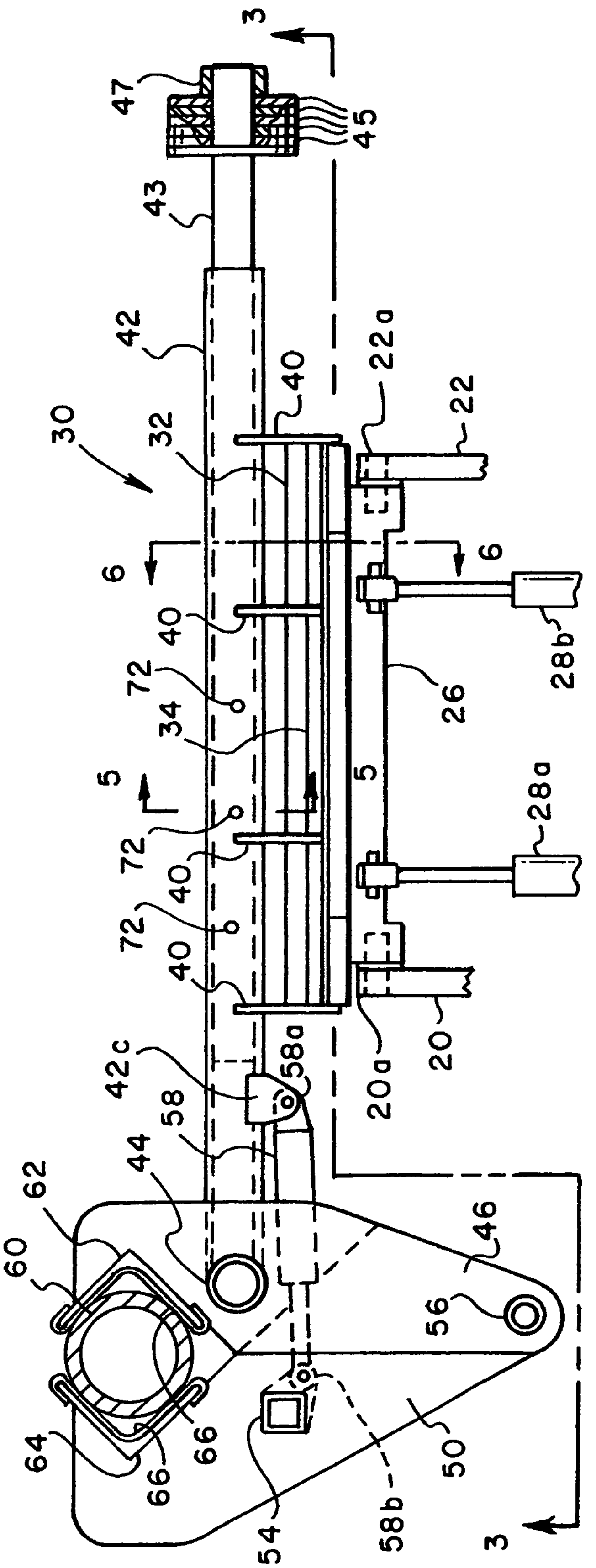
FIG. 4 is a top plan view of the apparatus shown in FIGS. 1 through 3, taken generally from line 4-4 of FIG. 2.

Booms 20 and 22 are provided with distal ends **20*a* and 22*a*, see FIG. 4 also, which are each pivotably connected to a support member 26 extending therebetween. Support member 26 may be moved relative to the booms 20 and 22 by additional pressure fluid actuators comprising hydraulic piston and cylinder type actuators 28***a* and 28*b*, suitably operably connected between respective booms 20 and 22 and support member 26, again, see FIG. 4. Support member 26 may take various configurations but one configuration operable with the present invention comprises a support member frame part 27, FIG. 6, and one or more spaced apart support plates 28 each having a somewhat diamond or triangular shaped upper end 29, and a lower flange 31, FIG. 6.

Those skilled in the art will recognize that the articulation structure of the loader 10 may be, essentially, reproduced in other self-propelled vehicles, such as conventional tractors, other off-road vehicles and other types of so-called skid steer vehicles wherein the apparatus of the invention essentially requires one or more movable booms and a support member mounted at a distal end of the boom and movable relative to the boom for manipulation of the apparatus of the invention.

Referring further to FIGS. 1 and 2, the invention includes a pole grasping and handling apparatus, generally designated by the numeral 30. Apparatus 30 includes a frame 32, see FIGS. 1, 4 and 6, characterized by an elongated plate-like member 34 which is configured with a somewhat diamond or triangular shaped recess 36 for receiving corresponding diamond or triangular shaped projections 29 on the support member 26, as illustrated. Plate member 34 may conform somewhat to the shape of the support member 28 and may include one or more spaced apart recesses 38, one shown in FIG. 6 for receiving bosses 28*c* of support plate 28, one shown, which bosses are hollow and may project through the recesses or openings 38 and are operable to be locked in position by one or more removable keys 28*d*, FIG. 6, for example. Frame 32 further includes spaced apart gussets 40 secured to plate 34 and to an elongated tubular beam 42 of apparatus 30.

Figure 3:
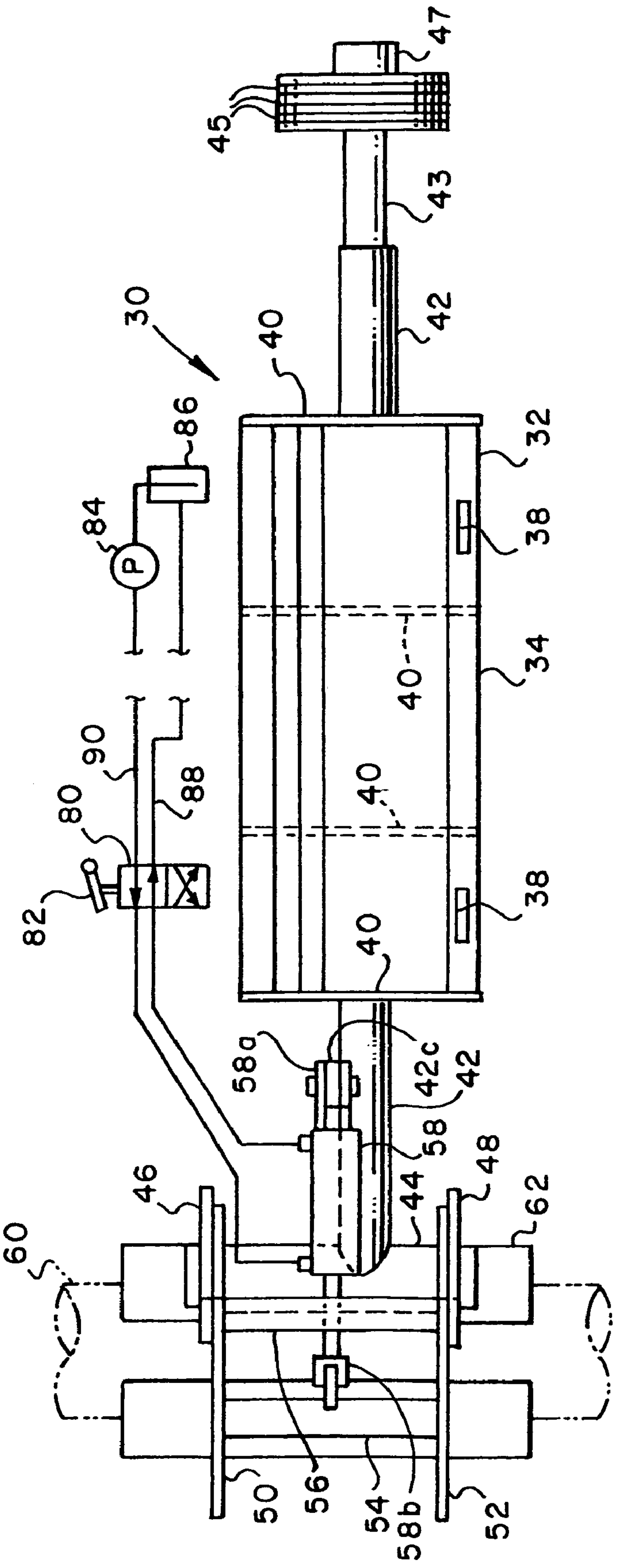
FIG. 3 is a rear elevation of the apparatus shown in FIGS. 1 and 2, and taken generally from the line 3-3 of FIG. 4.

Referring further to FIGS. 3 and 4, one end of beam 42 is connected to a transversely extending tubular post member 44 which supports spaced apart pole grasping jaw support plates 46 and 48. Support plates 46 and 48 are fixed to post 44 and are not moveable relative to each other. Support plates 46 and 48 support moveable pole grasping jaw support plates 50 and 52, FIG. 3, which are essentially identical in shape as are the plates 46 and 48 with respect to each other. Jaw support plates 50 and 52 are interconnected by a square cross section post member 54, FIGS. 3 and 4, and are also pivotally connected to the jaw support plates 46 and 48 at a pivot pin 56.

As further shown in FIGS. 3 and 4, apparatus 30 includes an actuator 58, preferably comprising a hydraulic cylinder and piston type actuator, which is secured at one end 58*a* to a member 42*c* secured to tubular beam 42. The opposite or piston rod end 58*b* of actuator 58 is suitably secured to post member 54 whereby, in response to extension of the actuator 58, the jaw support plates 50 and 52 move in unison in a counterclockwise director, viewing FIG. 4, with respect to the pivot connection at pivot pin 56. In FIGS. 3 and 4, the jaws of the apparatus 30, supported by the sets of support plates 46, 48 and 50, 52 are in a closed position grasping a flag pole 60, for example.

Referring further to FIGS. 3 and 4, the apparatus 30 includes pole grasping jaws 62 and 64. Jaw 62 is supported by and between support plates 46 and 48 and jaw 64 is supported by and between movable jaw support plates 50 and 52. Jaws 62 and 64 may be formed by right angle steel metal shapes, for example. Jaws 62 and 64 may be provided with suitable non-abrasive replaceable jaw liners 66, respectively to prevent marring or denting an aesthetically pleasing pole, such as an elongated flag pole.

Figure 5:
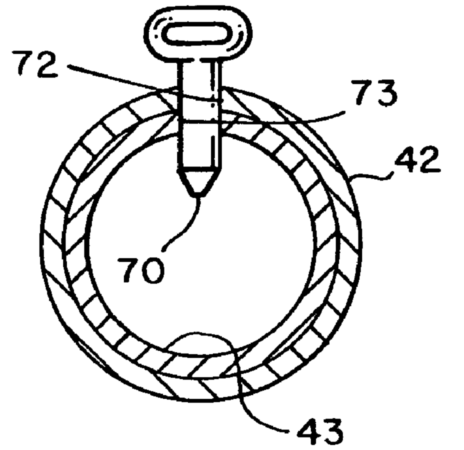
FIG. 5 is a detail section view taken generally along the line 5-5 of FIG. 4.

Referring still further to FIGS. 3, 4 and 5, the tubular beam 42 is adapted to support and receive a telescoping counterweight beam member 43 which is shown received within tubular beam 42 in the drawing figures. Counterweight beam 43 supports plural disc-like counterweights 45 at its distal end and which are removably retained connected to the distal end of counterweight beam 43 by a suitable retainer 47. Moreover, the position of the counterweights 45 with respect to the support member 26 may be adjusted by moving the counterweight beam 43 longitudinally within the tubular beam 42 to a selected position and retaining the counterweight beam in its selected position by one or more removable retaining pins 70, one shown in FIG. 5.

Retaining pin 70 may be selectively located within one or more openings 72, FIG. 4, formed in tubular beam 42. One or more corresponding openings 73 may be formed in beam 43 and, when selected openings 72 and 73 are aligned with each other, permit insertion of the retaining pin or pins 70, as shown in FIG. 5, for example. In this way, depending upon the length and weight of a pole to be handled by the apparatus 30, the apparatus may be stabilized by positioning the counterweights 45 at a greater or lesser distance from the support member 26 and also positioned closer to or further from a centerline of the vehicle or apparatus 10, for example.

Figure 6:
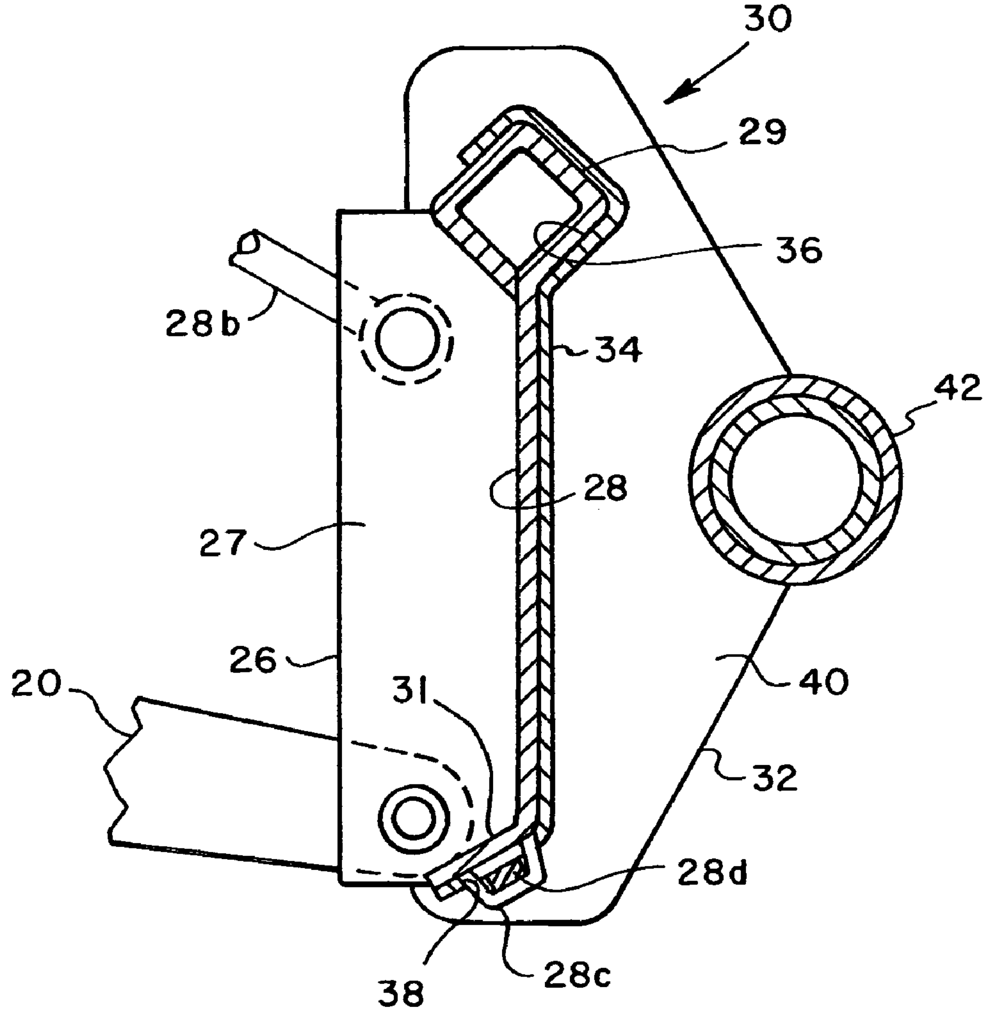
FIG. 6 is a detail section view taken generally along the line 6-6 of FIG. 4.

In the operation of the apparatus 10, 30 the frame 34 is suitably connected to the support member 26, as shown in FIG. 6, and the booms 20 and 22 positioned generally as indicated in FIG. 1, for pickup of a pole, such as the pole 60. In this position the booms 20 and 22 may be at least partially elevated by their respective actuators 24 and the support member 26 may be moved to a position generally parallel to the ground surface 11 on which the apparatus 10 is disposed by extension of the actuators 28*a* and 28*b* to pivot the frame 30 into the position shown with the jaws 62 and 64 extending substantially horizontally in a position to grasp the pole 60. Jaws 62 and 64 are moved relative to each other by actuation of the actuator 58 which may be carried out by the operator of the apparatus 10 along with operation of the actuators 24, 28*a* and 28*b*.

As shown in FIG. 3, for example, an auxiliary hydraulic circuit, commonly available on apparatus such as the apparatus 10, is operable to supply pressure fluid to the actuator 58 via a reversible control valve 80 which may include a manual or operator controlled actuator 82. Pressure fluid is provided by a pump 84 and an exemplary hydraulic reservoir 86 is operable to receive hydraulic fluid from a return line or circuit 88 while hydraulic fluid is supplied by way of the valve 80 to the actuator 58 through a supply line 90. The amount of grip applied to the pole 60 may be controlled by the operator of the apparatus 10 by way of the control valve 80, 82. Accordingly, with a pole, such as the pole 60, resting in a reclined position, the apparatus 10 may be positioned adjacent to the pole and the booms 20, 22 manipulated to position the jaws 62, 64 generally over or above the pole and with the jaws in an open position lower the booms 20, 22 to place the jaws in a position to grasp the pole when the actuator 58 retracts its piston rod to the position shown in FIG. 4. Once the pole 60 is firmly grasped, the apparatus 10 may move the pole to a location for insertion in the ground 11 or other structure and then raise the booms 20, 22 to, generally, the position shown in FIG. 2. Once the booms 20 and 22 have been raised to a suitable elevation so that the lower end 60*a* of pole 60 will clear the ground 11, the actuators 28*a* and 28*b* may be retracted to a position which will orient the support member 26 with its support plate 28 substantially vertical which will place the frame 32 also in a substantially vertical position as shown in FIGS. 2 and 6 whereby the jaws 62 and 64 are also now extending substantially vertically. The apparatus 10 may be moved to a selected position for placement of the pole 60 in a suitable receptacle, such as a hole 11$a$ in the earth's surface, FIG. 2, after suitable preparation of the hole. With the pole 60 positioned as shown in FIG. 2, the operator may relax pressure on the cylinder actuator 58 to allow the jaws 62 and 64 to relax their grip on the pole 60 and allow same to slide downwardly into the aforementioned receptacle. Once the pole 60 is stabilized in its working position, the actuator 58 may be operated to rotate the jaw 64 away from the jaw 62 sufficiently to allow the apparatus to be moved away from the pole whereby the booms 20, 22 may then be lowered and the apparatus 10 placed in a selected position for its next operation.

Those skilled in the art will recognize that, for retrieving a pole from its working position to a reclining or transport position, the order of steps described above may be substantially reversed. Those skilled in the art will recognize that the apparatus 10, 30 is particularly versatile for handling pole like structures such as flag poles, utility poles, and other mast-like structures, all of which present certain problems in handling for movement between a reclined position and an erect working position. The apparatus of the invention is operable to handle poles of various configurations including poles of various cross sectional shapes including circular, square, octagonal and other shapes used for elongated pole structures. Moreover, the actuators described herein, including actuator 58, may be other than pressure fluid operated.

The fabrication of the apparatus 30, in particular, may be carried out using conventional manufacturing techniques and engineering materials used for construction equipment and the like and also using conventional components, such as hydraulic cylinder and piston type actuators and associated control elements.

Although a preferred embodiment of the invention has been described in detail herein, those skilled in the art will recognize that various substitutions and modifications may be made without departing from the scope and spirit of the appended claims.

What is claimed is:

1. In combination with means comprising at least one elongated boom mounted for movement between at least a partially reclined position and an elevated position, said boom supporting a movable frame support member at a distal end thereof and actuator means for moving said boom and for moving said frame support member with respect to said boom, an apparatus mountable on said support member, said apparatus comprising:

a frame including an elongated tubular beam member connected to said frame support member;

pole grasping jaw support members mounted on said frame for supporting opposed pole grasping jaws for movement relative to each other between pole grasping and non-grasping positions;

an actuator connected to at least one of said jaws for moving said one jaw relative to the other for grasping and releasing said pole wherein said apparatus may be moved between a reclined position of said pole and an erect position of said pole by movement of said boom and by movement of said frame support member relative to said boom; and a counterweight beam supported on said frame and including counterweight means supported at a predetermined position thereon for counteracting forces exerted on said apparatus, wherein said counterweight beam is telescopically received within said tubular beam member and is selectively positionable with respect to said tubular beam member for varying a counterweight moment acting on said frame.

2. The invention set forth in claim 1 wherein:

said jaw support members comprise a first set of spaced apart plates supporting a first jaw with respect of said frame and a second set of spaced apart plates supporting said second jaw for movement relative to said first jaw, said second set of plates being pivotally connected to said first set of plates for movement between pole grasping and non-grasping positions.

3. The invention set forth in claim 2 wherein:

said apparatus includes a pressure fluid actuator operably connected to said movable jaw and to said frame for moving said movable jaw between pole grasping and non-grasping positions.

4. The invention set forth in claim 3 wherein:

said pressure fluid actuator is a hydraulic piston and cylinder assembly.

5. The invention set forth in claim 4 including:

flow control valve means operably connected to said hydraulic cylinder and piston assembly for selectively controlling actuation of said hydraulic cylinder and piston assembly to control a grasping force between said jaws and said pole.

6. The invention set forth in claim 1 including:

retainer means interconnecting said tubular beam member and said counterweight beam for selectively retaining said counterweight beam in a predetermined position with respect to said frame.

7. The invention set forth in claim 1 wherein:

said frame comprises a support plate including at one end a recess for receiving a projection on said frame support member for selectively mounting said frame on said frame support member at will.

8. In combination with a vehicle including at least one elongated boom mounted for movement between at least a partially reclined position and an elevated position, said boom supporting a movable frame support member at a distal end thereof and respective actuators for moving said boom and for moving said frame support member with respect to said boom, an apparatus mountable on said support member, said apparatus comprising:

an elongated tubular frame that includes an elongated tubular beam member, wherein said frame is connected to said frame support member;

pole grasping jaw support members mounted on said frame for supporting opposed pole grasping jaws for movement relative to each other between pole grasping and non-grasping positions;

a jaw actuator connected to at least one of said jaws for moving said one jaw relative to the other for grasping and releasing said pole wherein said apparatus may be moved between a reclined position of said pole and an erect position of said pole by movement of said boom and by movement of said frame support member relative to said boom; and a counterweight beam telescopically received within said elongated tubular beam member and including counterweight means selectively positionable and supported at a predetermined position thereon for counteracting forces exerted on said apparatus and for varying a counterweight moment acting said frame.

9. The invention set forth in claim 8 wherein:

said jaw support members comprise a first set of spaced apart plates supporting a first jaw with respect of said frame and a second set of spaced apart plates supporting said second jaw for movement relative to said first jaw, said second set of plates being pivotally connected to said first set of plates for movement between pole grasping and non-grasping positions.

10. The invention set forth in claim 8 wherein:

said jaw actuator includes a hydraulic piston and cylinder assembly operably connected to said movable jaw and to said frame for moving said movable jaw between pole grasping and non-grasping positions.

11. The invention set forth in claim 10 including:

flow control valve means operably connected to said hydraulic cylinder and piston assembly for selectively controlling actuation of said hydraulic cylinder and piston assembly to control a grasping force between said jaws and said pole.

12. The invention set forth in claim 8 including:

retainer means interconnecting said tubular beam member and said counterweight beam for selectively retaining said counterweight beam in a predetermined position with respect to said frame.

13. Apparatus for use in combination with means comprising at least one elongated boom mounted for movement between at least a partially reclined position and an elevated position, said boom supporting a movable frame support member at a distal end thereof and respective actuators for moving said boom and for moving said frame support member with respect to said boom, said apparatus being mountable on said support member and comprising:

a frame operable to be connected to said frame support member;

pole grasping jaw support members mounted on said frame for supporting opposed pole grasping jaws for movement relative to each other between pole grasping and non-grasping positions; and an actuator connected to at least one of said jaws for moving said one jaw relative to the other for grasping and releasing said pole wherein said apparatus may be moved between a reclined position of said pole and an erect position of said pole by movement of at least one of said boom and said frame support member relative to said boom; and a counterweight beam supported on said frame and including counterweight means supported at a predetermined position thereon for counteracting forces exerted on said apparatus.

14. The invention set forth in claim 13 wherein:

said jaw support members comprise a first set of spaced apart plates supporting a first jaw with respect of said frame and a second set of spaced apart plates supporting said second jaw for movement relative to said first jaw, said second set of plates being pivotally connected to said first set of plates for movement between pole grasping and nongrasping positions.

15. The invention set forth in claim 13 wherein:

said frame includes an elongated tubular beam member and said counterweight beam is telescopically received within said tubular beam member and is selectively positionable with respect to said tubular beam member for varying a counterweight moment acting on said frame.

16. The invention set forth in claim 13 wherein:

said apparatus includes a pressure fluid actuator operably connected to said movable jaw and to said frame for moving said movable jaw between pole grasping and non-grasping positions.

17. The invention set forth in claim 16 wherein:

said pressure fluid actuator is a hydraulic piston and cylinder assembly.

18. The invention set forth in claim 17 including:

flow control valve means operably connected to said hydraulic cylinder and piston assembly for selectively controlling actuation of said hydraulic cylinder and piston assembly to control a grasping force between said jaws and said pole.

19. The invention set forth in claim 13 including:

retainer means interconnecting said tubular beam member and said counterweight beam for selectively retaining said counterweight beam in a predetermined position with respect to said frame.

20. The invention set forth in claim 13 wherein:

said frame comprises a support plate including at one end a recess for receiving a projection on said frame support member for selectively mounting said frame on said frame support member at will.

* * * * *